(No Model.)
L. M. DEVORE.
ELASTIC CHECK REIN HOLDER.
No. 250,058. Patented Nov. 29, 1881.
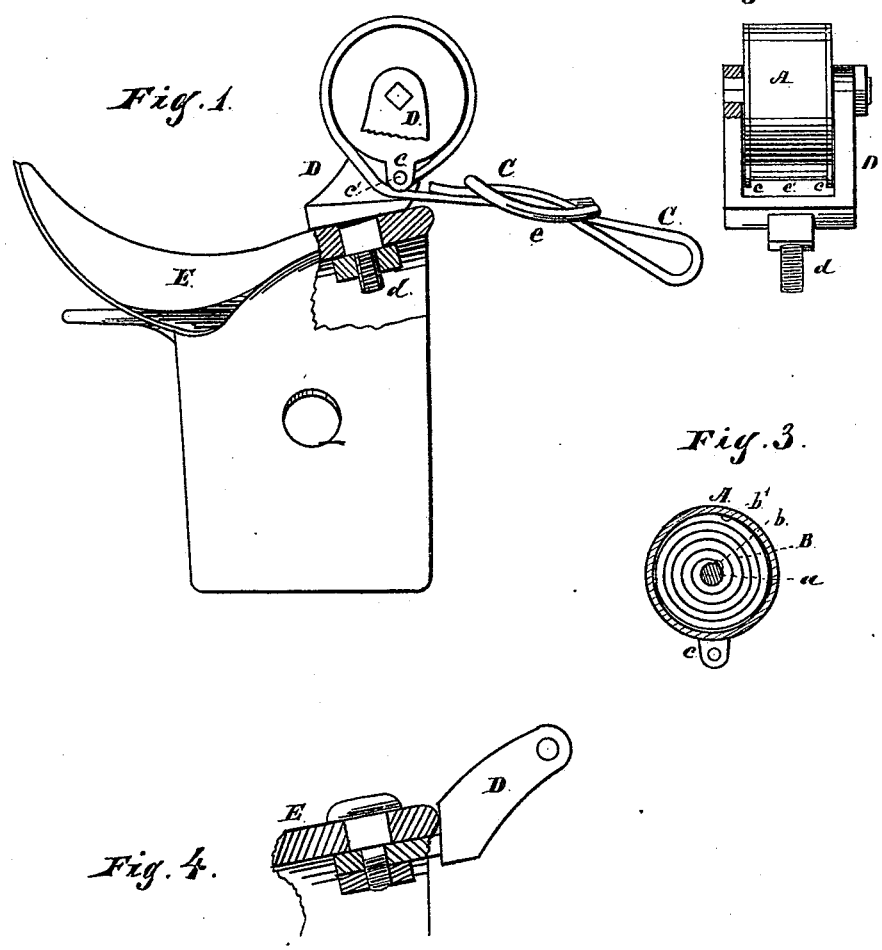
Witnesses:
A. H. Adams
B. A. Price
Inventor:
Levi M. Devore
By West & Bond
His Attys.

UNITED STATES PATENT OFFICE.

LEVI M. DEVORE, OF FREEPORT, ILLINOIS.

ELASTIC CHECK-REIN HOLDER.

SPECIFICATION forming part of Letters Patent No. 250,058, dated November 29, 1881.

Application filed August 3, 1880. (No model.)

*To all whom it may concern:*

Be it known that I, LEVI M. DEVORE, residing at Freeport, in the county of Stephenson and State of Illinois, and a citizen of the United States, have invented a new and useful Improvement in Elastic Check-Rein Holders, of which the following is a full description, reference being had to the accompanying drawings, in which—

Figure 1 is a side elevation with the saddle-tree partly in section; Fig. 2, an end elevation, showing the barrel and its support detached, with the upper end of one standard in section; Fig. 3, a detail in section of the barrel detached, showing also the spring; Fig. 4, a detail showing a form of construction for the standards for attachment to the under side of the saddle-tree.

The object of my invention is to provide a device for keeping the check-rein taut or under sufficient tension to cause the horse to keep its head erect and its neck arched to present a handsome appearance. This object I attain by the construction of device clearly illustrated in the accompanying drawings, and which I will now describe in detail.

In the drawings, A represents the barrel; B, the spring; C, the attaching-strap; D, the standards or supports; E, the ordinary saddle-tree; a, the axle or arbor of the barrel; b b', rivets or screws for attaching the ends of the spring; c, ears between which is located one end of the attaching-strap; c', fastening-pin for the strap; d, nut and bolt or screw for attaching the standards to the saddle-tree; e, the strap-buckle.

The barrel A may be made of brass or other suitable material, and is so formed that its heads or ends project beyond the periphery of the central or drum portion and form flanges e', which serve as guides for the attaching-strap. This barrel has one or both heads attached, so as to be removable, and is mounted upon a shaft or arbor, a, the ends of which are rigidly secured in the upper ends of the standards D, and on each head or flange, as shown, is an ear or projection, c, arranged so as to be in line with each other.

The spring B may be made of steel or other suitable material, and is attached at one end by a screw or rivet, b, to the shaft a, and at the other end by a screw or rivet, p', to inside of the drum of the barrel, as shown in Fig. 3, the spring being so attached and arranged that it will act to rotate the barrel in the direction to wind the attaching-strap thereon in the direction to draw on the check-rein and keep it taut.

The strap C is made of leather or other light flexible material, and is secured at one end between the ears c to the periphery of the barrel by a pin, c'. This strap is then wound around the drum in a contrary direction to the action of the spring, its other end passing out, as shown, between the pin c' and the plate of the standard, and to this end is secured a buckle, e, so that the end can be passed over the check-rein and be secured by buckling, the check-rein being in the loop C' thus formed in the strap C.

The standards or supports D may be made of brass or other suitable material, the upper ends being left open for the insertion of the barrel, and the lower ends united by a base or plate. The upper ends, as shown, are provided with square openings to receive the square ends of the shaft or arbor a, which prevents the arbor from turning, and these standards or supports are attached to an ordinary saddle-tree by the bolt d, which passes through a suitable opening in the standard plate or base and an opening in the saddle-tree, and the attachment is completed by screwing up the nut. A screw could be used for this purpose, if desired, the screw passing through the base or plate and the saddle-tree. As shown in Fig. 1, the standards or supports are attached to the upper side of the saddle-tree, and the drum stands in nearly a vertical position. As shown in Fig. 4, the standards are attached to the under side of the saddle-tree and project forward. These standards may be attached by other means, and they may be made curved, as shown, or in some other form, so long as they support the barrel in such manner that it is free to revolve and not interfere with the winding of the strap thereon.

In use the strap C is connected with the check-rein, as described, and any down movement of the head of the horse draws or unwinds the strap from the drum or barrel, allowing perfect freedom of movement, and as the horse raises its head the action of the spring winds the strap into the barrel, keeping the check-rein taut and under sufficient strain for the purpose of keeping a check on the horse at all times.

This device is very simple in construction, and is well adapted for the use for which it is intended, as it can be adjusted to vary the degree of tension by lengthening the strap between the rein and the drum, and the tension exerted by the spring is greater when the strap is unwound, thereby tending to make the horse throw its head up in order to relieve the strain, and the end of the strap which receives the rein, being light and short, will be held up by the tension, and will not be liable to flop to any great degree and irritate the horse by striking it; and even if it does strike, the blow will be very slight; and by using a helical spring, if the strain is not sufficient, it can be easily remedied by shortening the spring or winding it on a smaller circle.

I am aware that an elastic check-rein holder has heretofore been composed of a cylinder mounted on an axis and containing a coiled spring, a strap being arranged around the cylinder and provided with a hook to connect with the check-rein, said cylinder being arranged in a case which is provided with a strap to connect with a hook on the harness-saddle. This construction and arrangement of device is open to objection, in that it is not permanently and rigidly attached to the harness saddle, but, being loosely connected with a hook by a simple loop, it will not be retained and confined permanently in place when not strained by the check-rein; and, further, as the device does not constitute a permanent fixture with the harness-saddle, it is liable to be easily lost or mislaid when the harness is not in use. In my invention such objections are avoided, the device cannot be accidentally detached from the harness-saddle, and therefore it is not liable to be lost or mislaid; and, further, my device forms a part of the structure of the saddle, and, being rigidly attached, it will be more efficient in withstanding sudden strains on the check-rein.

In conclusion I may remark that the arm D can be cast and provided with a screw, $d$, very cheaply, and that the screw and nut serve to secure the same to the saddle in a fixed and permanent månner; also, that the passing of the strap around the barrel lessens the strain upon the pin $c'$, which, owing to the sudden jerks of the horse's head, would otherwise be extremely liable to become broken.

What I claim as new, and desire to secure by Letters Patent, is—

In an elastic check-rein holder, the standards D D, joined at their lower ends and provided with a screw-threaded shank for attaching the same to the harness-saddle, in combination with the barrel A, provided with marginal flanges and arranged upon an axis secured in the upper ends of the standards, the coiled spring B, arranged within the barrel, and the strap C, connected at one end with the barrel and passed around the same, substantially as and for the purpose set forth.

LEVI M. DEVORE.

Witnesses:
O. W. BOND,
B. A. PRICE.